United States Patent [19]

Fries

[11] 4,196,590

[45] Apr. 8, 1980

[54] VAPOR BUOYANCY ENGINE

[76] Inventor: James E. Fries, 7860 Valley View, Buena Park, Calif. 90620

[21] Appl. No.: 884,145

[22] Filed: Mar. 7, 1978

[51] Int. Cl.² ............................................. F01K 25/06
[52] U.S. Cl. ........................................ 60/496; 60/649
[58] Field of Search .................. 60/495, 496, 649, 673

[56] References Cited

U.S. PATENT DOCUMENTS

| 29,149 | 7/1860 | Durham | 60/496 |
|---|---|---|---|
| 366,551 | 7/1887 | Baker | 60/496 |
| 3,715,885 | 2/1973 | Schur | 60/496 |

Primary Examiner—Allen M. Ostrager
Assistant Examiner—Stephen F. Husar
Attorney, Agent, or Firm—Edward A. Sokolski

[57] ABSTRACT

A wheel having a plurality of vanes which extend centrally out to the periphery thereof, is rotatably mounted on the walls of a main compartment. A first liquid is contained within this main compartment. A second liquid having a substantially lower boiling temperature than the first is contained within a second "boiler" compartment, the second compartment being mounted in the first and at least partially submersed in the first liquid. A source of heat is applied to the first compartment to heat this compartment and the liquid contained therein to a high enough temperature so as to cause the second liquid to boil. The vapor generated by virtue of the boiling of the second liquid is conveyed to a location beneath the wheel where it is released through port means such that the vapor bubbles rise in the first liquid and in rising are caught within the vanes of the wheel, which then exerts a buoyancy force, thereby rotatably driving the wheel. The vapor exits near the top of the wheel, then out of the main compartment. The wheel is coupled to drive means outside of the compartment, the drive means being employed to drive a mechanism, as may be desired.

13 Claims, 3 Drawing Figures

VAPOR BUOYANCY ENGINE

This invention relates to buoyancy engines, and more particularly to such an engine employing a vaned wheel rotatably mounted in a first liquid having a higher boiling temperature, this wheel being driven by bubbles derived from the vapor generated by means of a second liquid having a lower boiling temperature which is heated by the first liquid. Experiments with buoyancy engines were first initiated at the end of the eighteenth and beginning of the nineteenth centuries. Such early buoyancy engines generally employed a wheel having a plurality of buckets attached to the periphery thereof, these buckets operating to catch bubbles fed into the liquid beneath the wheel, thereby rotatably driving the wheel. The bubbles employed usually were of steam generated by boiling the water, or of air which was forced by means of an Archimedian screw under the water. Such early engines are described in a book entitled *From Watt to Clausius*, by Cardwell, published in 1971 by the Cornell University Press (pgs. 75, 77, 152, 153, 172 and 173). Development of these earlier buoyancy engines was apparently abandoned in favor of the steam piston engine in view of the bulk and relative inefficiency of these early designs and the abundance of fossil fuels. An early engine which employs two different boiling points is described in Pat. No. 1,162,052 to A. E. Hall, patented Nov. 30, 1975. This engine, however, is not of the buoyancy type but rather operates by introducing water into an oil filled rotor, the oil fill being heated to a high enough temperature to boil the water thereby generating steam, which forces the oil out through nozzles to drive turbine wheels. Other patents turned up in a search, but only of general interest to the present subject matter as they are not buoyancy engines, are U.S. Pat. No. 762,263 for a steam turbine, to Cazin (June 7, 1904), and U.S. Pat. No. 3,312,065 to Guin (April 4, 1967).

The present invention is a substantial improvement over prior art buoyancy engines. It is highly adaptable in its use and capable of a higher efficiency. It is relatively simple in construction, and lends itself to relatively compact design. The engine of the present invention has significant advantages over existing engines. First, it has a minimum number of moving parts and involves minimum wear of such parts as compared with most other types of engines. Further, it is relatively simple and economical in its construction and by virtue of its simplicity and small number of moving parts is inherently cheaper and easier to maintain. Also, the engine of the present invention can operate at much lower temperatures and pressures than existing heat engines of comparable power, which tends to decrease wear and make possible electrical power generation from stationary solar heat collectors. A particular advantage of the present invention is its environmental qualities. In view of the fact that it utilizes an external burner or other heat source, it generates minimal pollutants as compared with internal combustion engines. Further, in view of the fact that it employs an external heat source, the present invention can be easily adapted to operate on sunlight and less costly fuels which are not in critical supply. Wasted heat from industrial processes can also be used as a heat source. Also, the invention produces little noise.

It is therefore an object of this invention to provide a buoyancy engine of improved efficiency and more compact construction than prior art engines of this type.

It is a further object of this invention to provide an engine having good efficiency which is relatively economical and simple in its construction.

It is still another object of this invention to provide an engine which is less subject to wear and maintenance problems.

It is still a further object of this invention to provide an engine which generates a minimum amount of pollutants.

It is still another object of this invention to provide an engine which can readily be adapted to operate on solar energy as well as less costly fuels which are not in critical supply, and waste heat from industrial processes.

It is still another object of this invention to provide an engine which operates quickly.

Still another object of this invention is to provide an engine which can operate at reduced temperatures and pressures.

Other objects of this invention will become apparent as the description proceeds in connection with the accompanying drawings, of which:

Figure 1:
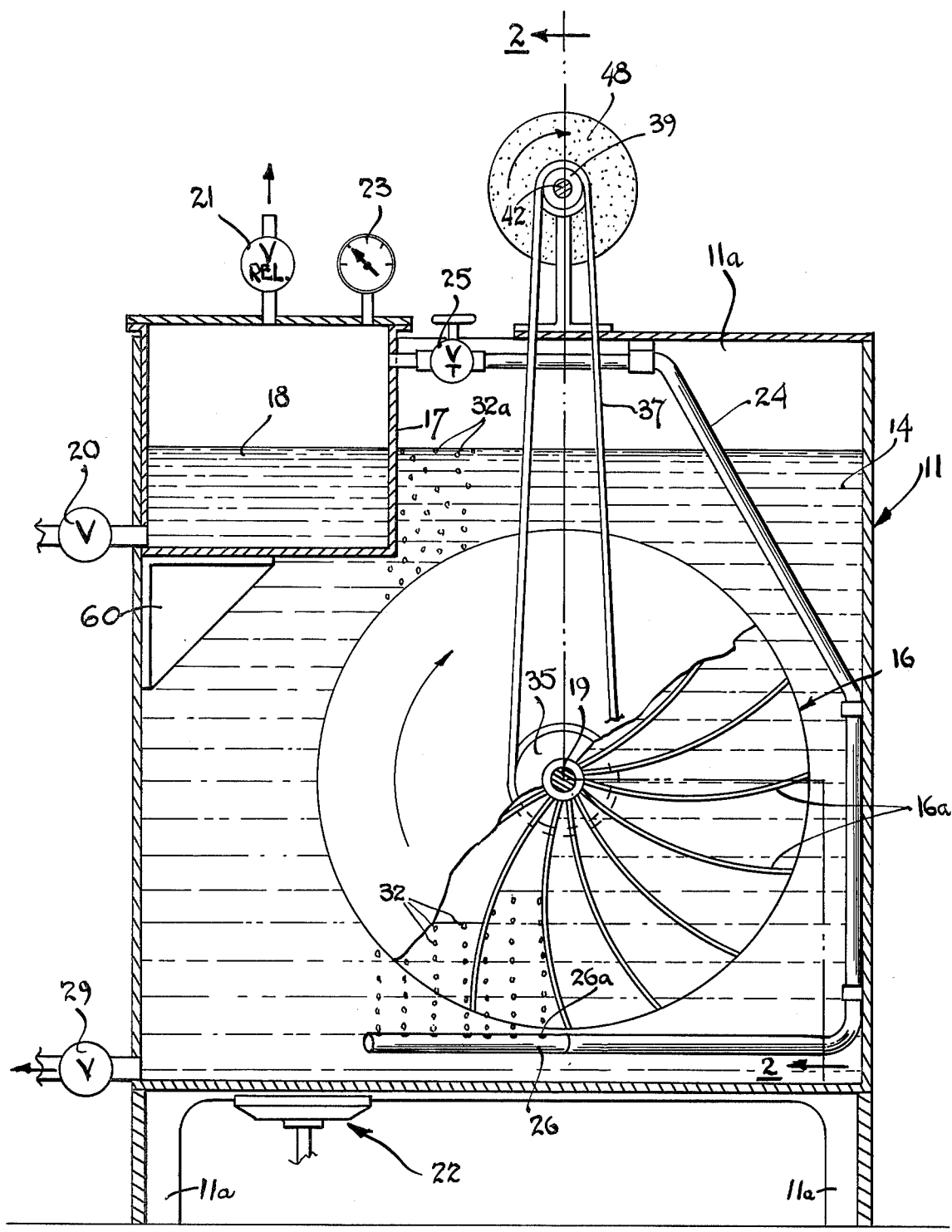
FIG. 1 is a side elevational view of a preferred embodiment of the invention.
Figure 2:
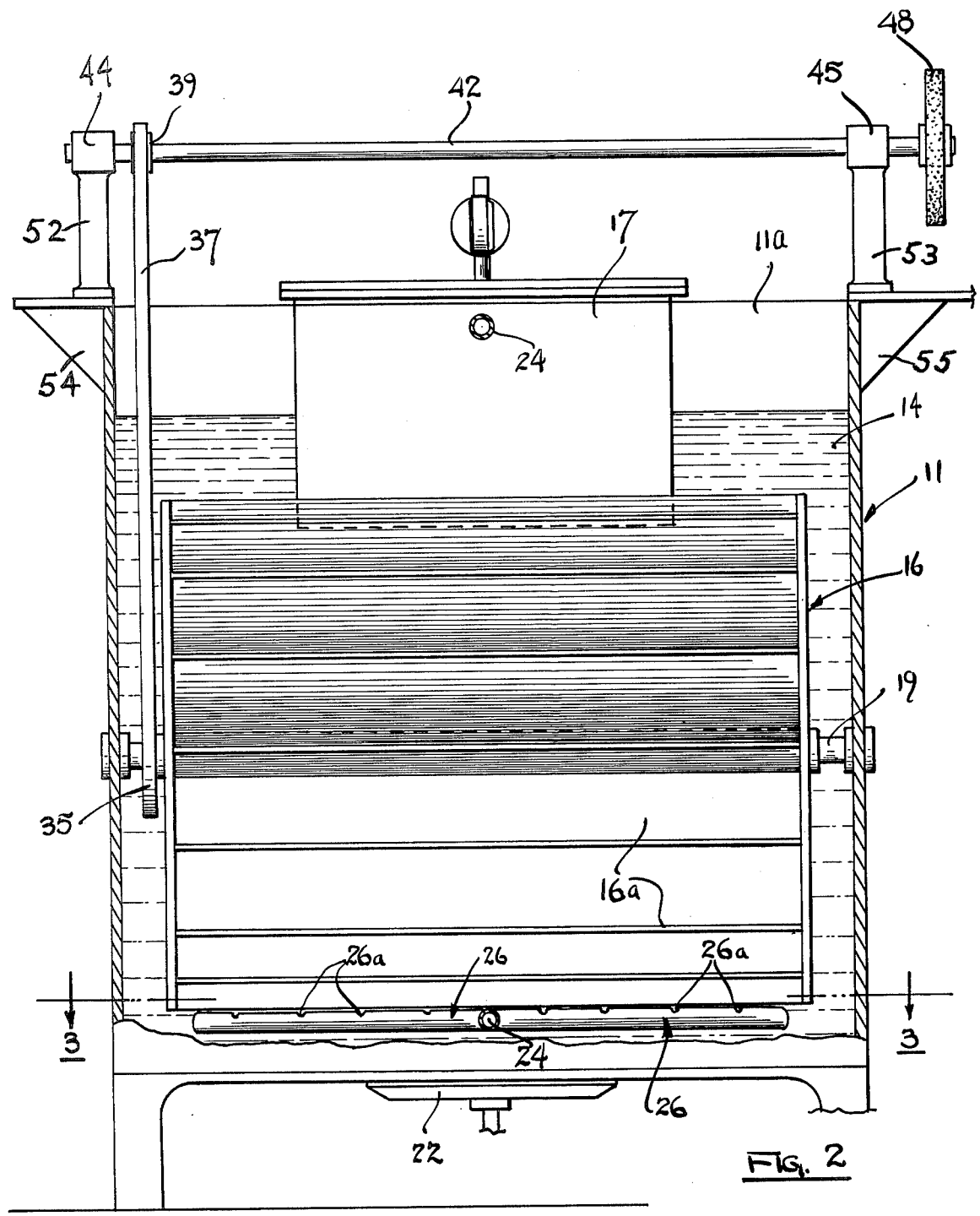
FIG. 2 is a cross-sectional view taken along the plane indicated by 2—2 in FIG. 1.

Briefly described, my invention is as follows:

A wheel having a plurality of vanes which extend out to the periphery thereof is supported for rotation within a first main container. A first liquid is contained within the main container, the level of this liquid being such that the wheel is at least partially submerged therein. A second container is mounted in the first container and at least partially submerged in the liquid of the first container. This second container has a second liquid contained therein, this second liquid having a substantially lower boiling point than the first liquid. Means are provided to heat the first container to a temperature such that sufficient heat is transferred to the second container so as to boil the liquid contained therein. The pressurized vapor generated by virtue of the boiling of the liquid in the second container is fed to an emitting device which is positioned below the wheel, such that gas bubbles are released from this device in a manner such as to drive the vanes of the wheel as they rise in the first liquid. The wheel is coupled to a drive mechanism which provides a drive force to a utilization device.

Unlike existing engines which use expanding gases to turn a turbine, as in a windmill or steam turbine engine, or engines which use expanding gases internally to drive pistons as in a gasoline or diesel engine, the present engine creates a stream of bubbles which float upwardly and are entrapped in a submersed vaned wheel which rotates as the bubbles rise towards the surface. A "boiler" is provided which is immersed totally or partially in the same liquid as the wheel and within which is a liquid for creation of the vapor from which the bubbles are generated. The liquid in the boiler has a lower boiling temperature than the liquid in the main container, such that the liquid in which the boiler and the wheel are at least partially submerged does not boil, while the liquid in the boiler does. This result can be achieved by utilizing liquids having different chemical compositions, such as, for example, water which has a boiling temperature of 100° C. at sea level, and methylene dichloride which as a 40° C. boiling point at sea level. The higher boiling point liquid acts as a reservoir of heat for the engine as well as a medium for the flotation of the gas and the rotation of the wheel. The higher boiling point liquid also prevents the condensation of the gas generated in the boiler and is essential to the maintenance of this gas in its gaseous state as it is being conveyed to the exhaust point beneath the wheel and until it exits the wheel near the top. The higher boiling point liquid may also be an oil which will lubricate the turning wheel.

The device of the present invention employs Archimedes' principle, namely that an object immersed in a liquid is buoyed up by a force equal to the weight of the displaced liquid. A wheel in which a gas displaces 1 cubic foot of water will be buoyed up by rising gas bubbles entrapped in its vanes by a force of approximately 62.4 pounds. If instead of water mercury were used, the force would be 800 pounds (approximate weight of 1 cubic foot of mercury). Also, the universal gas law which defines gas volume according to temperature and the molecular weight of boiling liquid is pertinent. For example, 84.9 grams of a liquid (methylene dichloride) with a molecular weight of 84 will produce 22.4 liters of gas at 40° C. at one atmosphere of pressure. Charles' and Boyle's lawas are also applicable, these laws holding that when the temperature is held constant, as in the case of a rising gas bubble through a hot liquid, the volume of the bubble will increase as it rises because the pressure of the liquid above the bubble decreases as the bubble approaches the surface of the liquid. Thus, bubbles entrapped in a turning wheel will displace more fluid towards the top of the wheel than towards the bottom.

Referring now to the Figures, a preferred embodiment of the invention is illustrated. Container 11 which may be hereinafter referred to as the main container is supported on legs 11a, and has a liquid contained therein which may for example be water. Rotatably supported in liquid 14 and totally submerged therein is wheel 16 which has a plurality of curved vanes 16a which extend from the center of the wheel to the periphery thereof. It is to be noted that the wheel need not be totally submersed in the liquid and can have its top portions exposed therefrom. Wheel 16 is rotatably mounted on axle 19, which is supported on the walls of container 11. A smaller container 17 is mounted within container 11 on shelf 60, this smaller container serving as a boiler and being substantially air tight. Container 17 has a liquid 18 contained therein, this liquid having a substantially lower boiling temperature than liquid 14. Typically, liquid 14 may comprise water which has a boiling temperature of 100° C. at sea level, and liquid 18 may comprise methylene dichloride which has a boiling temperature of 40° C. at sea level. Depending on the particular applications to which the engine is to be put, various combinations of liquids can be used for liquids 14 and 18. For example, for heavy duty engines which are relatively large in size and which are capable of handling high heats, liquid 14 may be a self-lubricating non-corrosive liquid such as a suitable petroleum based mineral, silicon, or vegetable oil, while liquid 18 is water. For engines of a relatively small size which are capable of handling a relatively high workload, liquid 14 can be mercury, while liquid 18 is water. For engines which require a minimum amount of heat, such as for example where solar power is used as the heat source, liquid 14 may be water and liquid 18 a light volatile organic solvent which is non-flammable and non-soluble in water and having a low boiling temperature, such as methylene dichloride or chloroform (or even a flammable solvent such as isopentane, b.p.=27° C.

Liquid is fed into container 17 through valve 20. A relief valve 21 is provided to relieve the pressure should this be necessary, while a pressure gauge 23 is provided to indicate the pressure within chamber 17. A conduit 24 is provided between chamber 17 and gas release or porting device 26, a valve 25 being used to control the flow of gas from chamber 17. Chamber 11 is filled with liquid through an opening 11a in its top, a drain valve 29 being provided to drain liquid from the chamber when so desired.

A heater 22 which may be a gas heater is used to heat chamber 11 to bring the chamber and liquid 14 to a high enough temperature so as to cause the liquid 18 to boil. In certain instances, it may be desirable to heat liquid 14 outside of the chamber and to run the heated liquid through the chamber by means of a circulation system. Other types of heaters can be used employing various types of combustible material such as oil, coal, organic materials, diesel fuel, wood, "spent" nuclear fuel, etc. Also, as mentioned before, a solar collector can be employed to directly heat the container or can be used to heat liquid 14 in a solar heater external to the container either directly or through a heat exchanger, with the heated liquid being circulated through the container. Liquid heater in a solar collector or other heating device may also be circulated through heat exchanger coils placed in liquid 14 to effect the heating of liquid 14.

Figure 3:
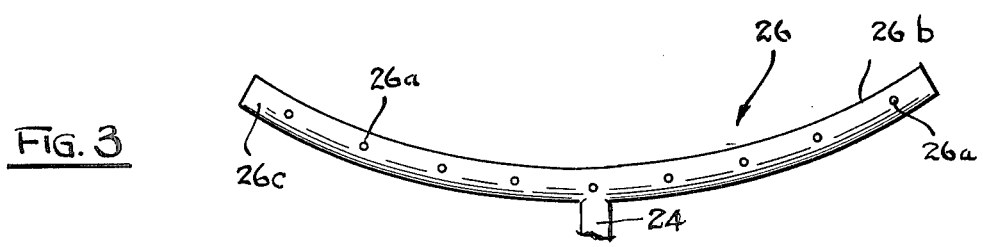
FIG. 3 is a top plan view illustrating the vapor release mechanism of the preferred embodiment.

Operation of the device is as follows: Liquid 18 is heated to its boiling temperature and the vapor resulting therefrom is fed through line 24 to gas release or porting device 26 which is positioned beneath wheel 16. Gas release device 26, as best can be seen in FIG. 3, forms a manifold for directing the flow of gas bubbles as desired and has a plurality of ports 26a on the upper side thereof, through which the vapor gas is emitted forming bubbles 32 which rise upwardly, and in so doing are caught within the spaces provided by vanes 16a. Preferably, the combined cross-sectional area of ports 26a is equal to or greater than the cross-section area of pipe 26. Vanes 16a have a curvature such as to hold the gas for optimum position before exiting the wheel near the top, as shown at 32a. The gas then exits the main compartment through opening 11a. In an operative model of the device of the invention, it has been found that curved vanes having diameters which are nearly equal to the radius of the large wheel provide excellent results.

The end portions 26b and 26c of gas emitting device 26 are curved so that gas bubbles are simultaneously applied to adjacent vanes on one side of the wheel, thus facilitating the initiation of the buoyant force for the driving action. A pulley wheel 35 is attached to wheel 16, this pulley wheel being coupled by means of drive belt 37 to pulley wheel 39. A chain and gear wheel may be used in lieu of belt 37 and wheel 39 respectively. Pulley wheel 39 is fixedly attached to shaft 42, this shaft being rotatably mounted on support bearings 44 and 45. Bearings 44 and 45 are supported on posts 52 and 53 respectively, which in turn are supported on associated shelves 54 and 55. Fixedly attached to shaft 42 is a grinding wheel 48.

The engine of this invention, of course, can be utilized to drive all sorts of apparatus, the particular implementation in connection with the grinding wheel being solely for illustrative purposes.

The system shown for the boiler of the illustrative embodiment is an open cycle system, i.e., the vapor generated by the boiler is vented out into the atmosphere after it has performed its function in driving wheel 16. The system illustrated can be readily modified to a closed cycle system by closing off the top of container 11 and providing a venting line for collecting the vapor which can then be passed through a condenser which restores it to liquid form, the condensed liquid then being recirculated back into tank 17. Such a recirculating system would preferably be used on engines when the liquid which is boiled is toxic or expensive or flammable. While it is preferable that vanes 16a be curved, it is possible in certain instances that straight sided vanes could be employed.

While the invention has been described and illustrated in detail, it is to be clearly understood that this is intended by way of illustration and example only and is not to be taken by way of limitation, the spirit and scope of this invention being limited only by the terms of the following claims.

I claim:

1. A method for rotatably driving a vaned wheel comprising:
   rotatably mounting the wheel in a first container having a first liquid contained therein, the wheel being at least partially submerged in the first liquid,
   mounting a second substantially air tight container in the first container at least partially submerged in said first liquid, said second container having a second liquid contained therein, the second liquid having a substantially lower boiling point than the first liquid,
   heating the first liquid to a high enough temperature so as to cause the second liquid to boil but below the boiling temperature of the first liquid, and
   feeding vapor generated in the second container, by the boiling of the second liquid, to a position beneath the wheel whereby vapor bubbles are released which impinge against the vanes and drive the wheel as they rise in the first liquid.

2. A vapor buoyancy engine comprising
   a main container,
   a first liquid contained within the main container,
   a second closed container mounted in the first container and at least partially submerged within the liquid of the first container,
   a second liquid contained within the second container, the second liquid having a substantially lower boiling point than the first liquid,
   a wheel having a plurality of vanes extending substantially radially towards the periphery thereof,
   means for rotatably supporting said wheel within said main container, said wheel being at least partially submerged in said first liquid,
   means for heating the first liquid to a high enough temperature to cause the second liquid to boil but below the boiling temperature of the first liquid,
   a gas release device positioned in the first liquid beneath the wheel,
   means for coupling vapor from said second container to said gas release device such that gas bubbles are released in the first liquid so as to impinge against the vanes and thereby drive the wheel rotatably as they rise in the first liquid,
   a device to be driven, and
   means for coupling said wheel to said device in driving relationship.

3. The engine of claim 2 wherein the means for heating the first liquid comprises a heating device for heating the outside walls of said main container.

4. The engine of claim 2 wherein the wheel is fully submerged in the first liquid.

5. The engine of claim 2 wherein the vanes are curved.

6. The engine of claim 5 wherein the curvature of the vanes is such that the diameters thereof are substantially equal to the radius of the wheel.

7. The engine of claim 2 wherein the gas release device is in the form of a pipe having a plurality of ports formed therein, said pipe having curved ends such that gas bubbles are simultaneously applied to adjacent vanes of the wheel.

8. The engine of claim 7 wherein the sum of the cross-sectional areas of said ports is equal to or greater than the cross-sectional area of said pipe.

9. The engine of claim 2 wherein said second container is air tight.

10. The engine of claim 2 wherein said first liquid is water and the second liquid is methylene dichloride.

11. The engine of claim 2 wherein the first liquid is an oil selected from the class consisting of mineral, silicon and vegetable oil, and the second liquid is water.

12. The engine of claim 2 wherein the first liquid is mercury and the second liquid is water.

13. The engine of claim 2 wherein the means for coupling the vapor from the second container to the gas release device comprises a conduit running from the second container to the gas release device.

* * * * *